Figure 1:
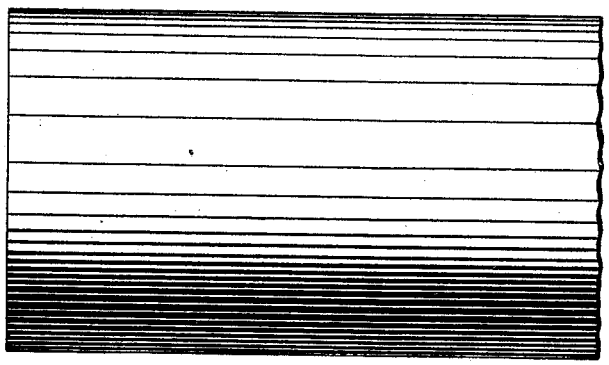
Figure 2:
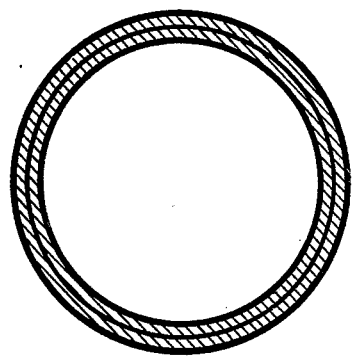

D. C. GATELY.
WATER-PROOF HOSE.

No. 186,123.   Patented Jan. 9, 1877.

Attest:
Ewell a Dick
J. F. Chapman

Inventor
Dennis C. Gately by
Pollok & Bailey his attys

UNITED STATES PATENT OFFICE.

DENNIS C. GATELY, OF NEWTON, CONNECTICUT.

IMPROVEMENT IN WATER-PROOF HOSE.

Specification forming part of Letters Patent No. 186,123, dated January 9, 1877; application filed November 27, 1876.

*To all whom it may concern:*

Be it known that I, DENNIS C. GATELY, of Newton, in the county of Fairfield and State of Connecticut, have invented certain new and useful Improvements in the Manufacture of Water, Gas, and Steam Proof Hose; and I hereby declare the following to be a full, clear, and exact description of the same.

It has heretofore been attempted to make seamless woven hose water, gas, and steam proof by lining, or lining and coating, the same with an india-rubber or other vulcanizable and vulcanized compound.

The first attempts failed of practical results, because the lining of such hose by means of a vulcanizable composition could only be effected by applying the same externally, and by then turning the hose thus coated inside out. This mode of construction involved the use of a light and thin fabric, because thick hose could not be turned, and the strain to which even such thin hose was subjected in the turning operation rendered the already weak hose still weaker, so that for conveying liquids, gases, or steam, under pressure it was utterly inadequate and useless. Mr. Mayall, then of Roxbury, attempted, in 1859–60, to obviate this difficulty by compounding two or more such seamless woven hose, but without, however, attaining any practical results, and such hose has never, to my knowledge, been manufactured under the patent which was granted to him for his mode of construction on the 20th of March, 1860. According to his mode, it was proposed to strengthen the thin woven tube, which had been externally coated with india-rubber and turned afterward inside out, by slipping over it one or more seamless woven tubes of such larger diameter as to successively closely fit, and of such thickness as would give the hose, when completed, the requisite strength.

The objections to hose so made were numerous. It will suffice to mention that the several tubes of which the hose was composed could not be made to tightly fit by any means then known; that, unless externally waterproofed, they were exceedingly liable to decay or mildew from atmospheric causes and capillary action; and, finally, if cement was used intermediately between the several folds of the fabric or tubing, each tubing would have to be treated as the innermost—*i. e.*, coated and turned inside out—which thus defeated the very object sought to be obtained.

An improvement in the art of making water-proof seamless hose of the character referred to was brought by Isaac B. Harris. He discarded the idea of using several concentric woven tubes, but used a single tube, and waterproofed it by internal and external application of india-rubber. His process consisted, substantially, in a series of operations of a more or less delicate nature and difficult of performance, and necessarily slow in the production of the article. This process may be described, briefly, as follows: Into a woven tube was proposed to be placed a smaller size tube of unvulcanized but vulcanizable gum. Cold water was then introduced and maintained at a pressure of five pounds to the square inch, to press the rubber tube against the interior of the woven tube. This water was then gradually heated by admission of steam, and the pressure increased to forty pounds for twenty or thirty minutes. In this way, the rubber, becoming softened, was forced into the meshes of the fabric and made to firmly adhere to the interior of the hose, and thus make a permanent lining of the same. Before either of these operations, the woven fabric was put through the friction-calenders, so as to give it an external friction coat, which, when the hose was distended and heated by internal fluid-pressure, was utilized to cause a strip of india-rubber wound or lapped around the hose to adhere to it and constitute a protecting cover. The woven tube thus lined and coated was ready for vulcanization, which was effected in a heater at 300° Fahrenheit.

I have deemed it necessary to refer to this mode of operation in order to point out the disadvantages attending the same, and why it was abandoned almost entirely from the inception of the invention to the present day.

First. No single woven tube could be woven of sufficient thickness and strength to meet the requirements of conveying liquids or gaseous fluids under high pressures, and, therefore, however perfect the mode of applying the rubber might have been, such hose would have been at best an imperfect article.

Second. The lining, necessitating to be introduced into the woven tube in the green state or unvulcanized condition, did not have the cohesion of texture or resistance to withstand the strain to which it was subjected, and therefore was liable to tear and break, and it was consequently almost impossible to secure a perfect lining, however carefully the operation may have been conducted, and, as the injuries in the lining could not be ascertained during the manufacture of the hose, it would often, shortly after having been put to use, rot and decay.

Third. The operations which this manufacture involved were so numerous and delicate in their nature, requiring great care and much time, that a good article could not be manufactured except at a cost which would render the same unsaleable.

In 1868, or thereabout, Mr. Forsyth attempted to obviate the difficulties before mentioned by forming first, and independently of the hose to be lined, a perfect lining of vulcanized rubber, which, being externally coated with unvulcanizable gum or compound, was introduced into the interior of the hose and then expanded or distended by pressure of steam admitted within the interior of the lining. This mode of construction has no doubt had the great advantage over the Harris mode in this, that the lining was perfect; but, while it shared with Harris the objection attending the single hose, it presented the following disadvantages: first, the admission of steam at the desired pressure to produce the mollification of the unvulcanizable compound, and the compacting of the several layers, was apt to overvulcanize or deteriorate the lining; second, the unvulcanizable or unvulcanized gum between the woven hose and the vulcanized lining was apt to become hard and stiff when exposed to cold, and the hose would not resume its original cylindrical shape when unfolded or unbent and developed for use; third, the preparation of a sheet composed in part of vulcanizable and in part of unvulcanizable gum is difficult and expensive, while the handling of such sheet, particularly when the unvulcanizable compound is on the outside, is extremely delicate and troublesome, and unless great care is taken in the introduction of such tubing into the interior of the woven hose, it is liable to tear, notwithstanding the resistance which the vulcanized portion affords.

Having thus explained the state of the art prior to my invention, I shall now describe the mode which I have adopted with perfect success in the manufacture of hose, and the advantages which I have thereby attained, or objections to previous manufactures avoided.

I take woven hose, of any thickness or strength attainable, and coat it internally by means of an india-rubber cement, which I prefer to be made of such a compound as to vulcanize when subjected to proper heat. The coating internally is not effected by applying it externally and then turning the hose inside out, which would defeat one of the main objects I have in view, but by putting a certain quantity or mass of such cement inside the woven tube. I then thoroughly cover and impregnate the same by passing the hose containing the cement back and forth, as often as may be necessary, through squeezers or wringer-rolls, until the interstices of the woven fabric are entirely filled, and a film or coating of cement is well spread over the whole interior surface of the hose.

Into the hose thus prepared is introduced another seamless woven hose of a diameter less than that of the first, so that the latter shall snugly fit over it. Before the smaller hose is introduced, however, it is well coated externally with a vulcanizable compound. This is done by passing the hose when flat yet, as it generally comes from the weaver, between friction-calenders, as is well known to india-rubber manufacturers. In this way a double rubber coating—viz., the internal coating of the outer hose and the internal coating of the inner hose—will come in juxtaposition, and form together one body, which will have the effect of not only securely cementing together the two pieces of concentric hose, but of interposing between them, when vulcanized, an impermeable sheet of rubber, which is of incalculable advantage for use and durability of the hose.

The hose, thus compounded, is finished by the introduction of a lining. This is made of a vulcanizable compound into the form of a perfect tube, closely fitting the interior of the inner woven hose. This tube is subjected to semi-vulcanization—i. e., to a lower temperature for the usual length of time, or to higher temperature during a shorter time, than would produce perfect vulcanization.

This tube thus treated loses the stickiness attending unvulcanized rubber, and acquires sufficient consistency and resistance to enable one to pass it folded lengthwise into the interior of the inner hose without the slightest risk or danger of tearing it.

When this inner tube is placed into the hose, couplings are applied to the ends of the hose, and steam-connection is made with a steam-generator, so as to admit steam at the proper temperature and pressure to both compact the hose and perfect the vulcanization of the interior lining, as well as of the intermediate linings or coatings interposed between the concentric pieces of woven hose. The hose having been subjected to steam-heat and pressure, sufficient time to complete vulcanization, is then completed and ready for use.

I may add that before the rubber lining is introduced, the inner hose may be coated with an adhesive, preferably vulcanizable, cement; but this is not important or necessary, unless the vulcanization of the lining shall, before the introduction into the hose, have been too highly vulcanized, and thus deprived of its latent adhesiveness, and which is developed when steam is first admitted.

I would further say that more than two concentric pieces of woven hose may be combined in the same manner as described with reference to two, and the outermost hose may be protected externally by a sheet of vulcanized rubber applied, lapped lengthwise or spirally, or otherwise, in any known and suitable manner.

Having thus described my said invention, and the manner in which the same is or may be carried into effect, what I claim, and desire to secure by Letters Patent, is—

A water, gas, or steam proof hose composed of two or more concentric pieces of woven hose, having interposed between them vulcanized india rubber, and provided with a vulcanized sheet-rubber lining, or an external vulcanized sheet-rubber coating combined with such internal lining, the whole being made up substantially as herein set forth.

In testimony whereof I have hereunto signed my name this 24th day of November, A. D. 1876.

DENNIS C. GATELY.

Witnesses:
DANIEL PARKS,
HENRY L. WHEELER.